United States Patent
Kim et al.

(10) Patent No.: US 10,565,476 B1
(45) Date of Patent: Feb. 18, 2020

(54) METHOD AND COMPUTING DEVICE FOR GENERATING IMAGE DATA SET FOR LEARNING TO BE USED FOR DETECTION OF OBSTRUCTION IN AUTONOMOUS DRIVING CIRCUMSTANCES AND LEARNING METHOD AND LEARNING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/120,623

(22) Filed: Sep. 4, 2018

(51) Int. Cl.
*G06K 9/00* (2006.01)
*G06K 9/62* (2006.01)
(Continued)

(52) U.S. Cl.
CPC ....... *G06K 9/6256* (2013.01); *G06K 9/00805* (2013.01); *G06K 9/6262* (2013.01);
(Continued)

(58) Field of Classification Search
CPC ........ G06K 9/36; G06K 9/623; G06K 9/6231; G06K 9/6251; G06K 9/6265; G06K 9/66;
(Continued)

(56) References Cited

U.S. PATENT DOCUMENTS 9,141,883 B1 * 9/2015 Nam .................... G06F 16/583
10,095,977 B1 * 10/2018 Kim ..................... G06N 3/0454
(Continued)

OTHER PUBLICATIONS

Dwibedi, Debidatta, Ishan Misra, and Martial Hebert. "Cut, paste and learn: Surprisingly easy synthesis for instance detection." The IEEE international conference on computer vision (ICCV). 2017.*
(Continued)

*Primary Examiner* — Avinash Yentrapati
(74) *Attorney, Agent, or Firm* — Xsensus LLP

(57) ABSTRACT

A method for generating at least one data set for learning to be used for detecting at least one obstruction in autonomous driving circumstances is provided. The method includes steps of: a computing device (a) obtaining a first original image indicating a driving situation, and a first segmentation ground truth (GT) image corresponding to the first original image; (b) obtaining a second original image including a specific object, and a second segmentation GT image which includes segmentation information for the specific object and corresponds to the second original image; (c) obtaining a third original image by cutting a portion corresponding to the specific object, and a third segmentation GT image by cutting pixels corresponding to an area where the specific object is located; and (d) creating the data set for learning which includes a fourth original image and a fourth segmentation GT image corresponding to the fourth original image.

23 Claims, 3 Drawing Sheets

(51) Int. Cl.
  *G06T 7/174* (2017.01)
  *G06T 7/11* (2017.01)
(52) U.S. Cl.
  CPC ............ *G06T 7/11* (2017.01); *G06T 7/174* (2017.01); *G06T 2207/20081* (2013.01); *G06T 2207/30261* (2013.01)
(58) Field of Classification Search
  CPC . G06N 3/08; G06N 3/084; G06N 3/04; G06T 5/20; G06T 2207/20081; G06T 2207/20084; G06T 7/11; G06T 7/12
  See application file for complete search history.

(56) References Cited

U.S. PATENT DOCUMENTS

| | | | | |
|---|---|---|---|---|
| 2013/0063487 | A1* | 3/2013 | Spiegel | G06T 11/00 345/633 |
| 2015/0254868 | A1* | 9/2015 | Srikanth | H04N 5/23216 348/47 |
| 2017/0083792 | A1* | 3/2017 | Rodriguez-Serrano | G06F 16/54 |
| 2017/0243083 | A1* | 8/2017 | Wang | G06K 9/00711 |
| 2017/0337682 | A1* | 11/2017 | Liao | G06T 7/30 |
| 2018/0060701 | A1* | 3/2018 | Krishnamurthy | G06K 9/6269 |
| 2018/0260793 | A1* | 9/2018 | Li | G06Q 10/20 |
| 2018/0307942 | A1* | 10/2018 | Pereira | G06K 9/6215 |
| 2019/0147234 | A1* | 5/2019 | Kicanaoglu | G06K 9/00342 382/218 |
| 2019/0156485 | A1* | 5/2019 | Pfeiffer | G06K 9/00791 |
| 2019/0205606 | A1* | 7/2019 | Zhou | G06K 9/0014 |

OTHER PUBLICATIONS

Ros, German, et al. "The synthia dataset: A large collection of synthetic images for semantic segmentation of urban scenes." Proceedings of the IEEE conference on computer vision and pattern recognition. 2016. (Year: 2016).*

Dwibedi, Debidatta, Ishan Misra, and Martial Hebert. "Cut, paste and learn: Surprisingly easy synthesis for instance detection." Proceedings of the IEEE International Conference on Computer Vision. 2017. (Year: 2017).*

Alhaija, et al., "Augmented Reality Meets Computer Vision : Efficient Data Generation for Urban Driving Scenes", Computer Vision Lab, aiXiv:1708.01566v1, Aug. 4, 2017, 12 pp.

\* cited by examiner

METHOD AND COMPUTING DEVICE FOR GENERATING IMAGE DATA SET FOR LEARNING TO BE USED FOR DETECTION OF OBSTRUCTION IN AUTONOMOUS DRIVING CIRCUMSTANCES AND LEARNING METHOD AND LEARNING DEVICE USING THE SAME

FIELD OF THE INVENTION

The present invention relates to a method and a computing device for generating image data set for learning to be used for detection of at least one obstruction in autonomous driving circumstances and a learning method and a learning device using the same; and more particularly, to the method for generating at least one data set for learning to be used for detecting at least one obstruction in autonomous driving circumstances, including steps of: (a) the computing device obtaining (i) at least one first original image indicating at least one driving situation on at least one road and (ii) at least one first segmentation ground truth (GT) image corresponding to the first original image; (b) the computing device obtaining (i) at least one second original image including at least one image of at least one arbitrary specific object and (ii) at least one second segmentation GT image which includes segmentation information for the specific object and corresponds to the second original image; (c) the computing device obtaining (i) at least one third original image generated by cutting a portion corresponding to the specific object from the second original image and (ii) at least one third segmentation GT image generated by cutting pixels corresponding to an area where the specific object is located from the second segmentation GT image; and (d) the computing device creating the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located, and the computing device, the learning method and the learning device using the same.

BACKGROUND OF THE INVENTION

Deep Convolutional Neural Networks (Deep CNNs) are the heart of the remarkable development in deep learning. CNNs have already been used in the 90s to solve the problem of character recognition, but what has become as widespread as it is now is thanks to recent research. These deep CNNs won the 2012 ImageNet image classification tournament, winning other competitors. Then, the convolutional neural network became a very useful tool in the field of machine learning.

Image segmentation, on the other hand, takes a training image or a test image as input and produces a label image as an output. The deep learning has recently become popular, and segmentation is also using the deep learning.

On the other hand, when CNN is learned by a learning device in order to detect one or more obstacles in autonomous driving situations, the learning device must learn various objects to be encountered in the autonomous driving situations. For this purpose, "images for learning", e.g., images to be used for learning CNN, should be images in which various objects to be encountered in various autonomous driving circumstances are included.

However, in actual driving situations, various objects may exist on the road, but collecting such data on the various objects is not easy. In other words, specific images of specific objects that do not appear frequently on the road will not be easily obtained among general driving image data. For example, since a person, a bicycle, a vehicle, etc. are general images that can be easily obtained among the general driving image data, the learning process for improving detection performance using the general images can be easily performed. However, some uncommon images, i.e., the specific objects, such as a tiger and a crocodile cannot be easily obtained among the general driving image data, and thus the learning process for improving detection performance using the specific objects is not easy.

SUMMARY OF THE INVENTION

It is an object of the present invention to solve all the aforementioned problems.

It is another object of the present invention to secure data set(s) for learning to be used for improving the performance of detecting objects which are not frequently found in actual driving circumstances.

It is still another object of the present invention to provide a learning method for detecting objects which are not frequently found in the actual driving circumstances with high accuracy by learning parameters of convolutional neural network (CNN) using the data set(s) for learning.

In accordance with one aspect of the present invention, there is provided a method for generating at least one data set for learning to be used for detecting at least one obstruction in autonomous driving circumstances, including steps of: (a) a computing device obtaining (i) at least one first original image indicating at least one driving situation on at least one road and (ii) at least one first segmentation ground truth (GT) image corresponding to the first original image; (b) the computing device obtaining (i) at least one second original image including at least one image of at least one specific object and (ii) at least one second segmentation GT image which includes segmentation information for the specific object and corresponds to the second original image; (c) the computing device obtaining (i) at least one third original image generated by cutting a portion corresponding to the specific object from the second original image and (ii) at least one third segmentation GT image generated by cutting pixels corresponding to an area where the specific object is located from the second segmentation GT image; and (d) the computing device creating the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located.

As one example, the step of (d) includes: (d_1) the computing device modifying the third original image and the third segmentation GT image by a same scheme, to thereby create modified third original images and modified third segmentation GT images, respectively; and (d_2) the computing device combining the modified third original images and the modified third segmentation GT images with the first original image and the third segmentation GT image, respectively.

As one example, at the step of (d_1), the computing device modifies the third original image and the third segmentation GT image using at least one of affine transformation algorithm and thin-plate spline interpolation algorithm.

As one example, the computing device repeatedly performs the step of (d_1) and the step of (d_2) while changing at least part of the algorithms applied at the step of (d_1) and specific parameters thereof to thereby generate the plurality of different fourth original images for learning and the plurality of different fourth segmentation GT images for learning.

As one example, the first original image and the first segmentation GT image are selected from a database of various road-driving images and a database of segmentation GT images corresponding thereto, respectively, and wherein the second original image and the second segmentation GT image are selected from a database of various original images of various objects by types of objects and a database of semantic segmentation GT images corresponding thereto, respectively.

As one example, at the step of (c), the computing device cuts the specific object from the second original image and the second segmentation GT image using semantic segmentation information of the second segmentation GT image.

As one example, at the step of (c), the computing device (i) cuts an area having semantic segmentation information for the specific object in the second segmentation GT image to thereby obtain the third segmentation GT image and (ii) refers to location of the pixels within the second original image corresponding to pixel information of the third segmentation GT image in the second segmentation GT image to thereby obtain the third original image.

As one example, at the step of (d), the computing device (i) determines a portion corresponding to a road in the first original image, then combines the third original image with the first original image in such a way that the third original image is located at an arbitrary location in the portion corresponding to the road in the first original image to thereby generate the fourth original image for learning and (ii) combines the third segmentation GT image with the first segmentation GT image in such a way that the third segmentation GT image is located at a particular location in the first segmentation GT image corresponding to the arbitrary location in the first original image to thereby generate the fourth segmentation GT image for learning.

As one example, at the step of (d), the computing device performs processes of generating the fourth original image for learning and the fourth segmentation GT image for learning for a multiple times to thereby generate the plurality of different fourth original images for learning and the plurality of different fourth segmentation GT images for learning.

As one example, the first segmentation GT image includes segmentation information on the road.

In accordance with another aspect of the present invention, there is provided a method for learning through a convolutional neural network (CNN), including steps of: (a) a learning device, on condition that (I) a computing device has obtained (i) at least one first original image indicating at least one driving situation on at least one road and (ii) at least one first segmentation ground truth (GT) image corresponding to the first original image; (II) the computing device has obtained (i) at least one second original image including at least one image of at least one arbitrary specific object and (ii) at least one second segmentation GT image which includes segmentation information for the specific object and corresponds to the second original image; (III) the computing device has obtained (i) at least one third original image generated by cutting a portion corresponding to the specific object from the second original image and (ii) at least one third segmentation GT image generated by cutting pixels corresponding to an area where the specific object is located from the second segmentation GT image; and (IV) the computing device has created the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located, receiving the fourth original image for learning as at least one image for learning to be used for detecting at least one obstruction in autonomous driving circumstances; and (b) the learning device applying a plurality of operations of the CNN to the fourth original image for learning to thereby obtain an output image and comparing the output image with the fourth segmentation GT image for learning, and then adjusting a parameter thereof through backpropagation.

As one example, at the process of (IV), (IV_1) the computing device has modified the third original image and the third segmentation GT image by a same scheme, to thereby create modified third original images and modified third segmentation GT images, respectively; and (IV_2) the computing device has combined the modified third original images and the modified third segmentation GT images with the first original image and the third segmentation GT image, respectively.

As one example, the computing device has repeatedly performed the process of (IV_1) and the process of (IV_2) while changing at least part of the algorithms applied at the process of (IV_1) and specific parameters thereof to thereby generate the plurality of different fourth original images for learning and the plurality of different fourth segmentation GT images for learning.

As one example, at the process of (IV), the computing device (i) has determined a portion corresponding to a road in the first original image, then has combined the third original image with the first original image in such a way that the third original image is located at an arbitrary location in the portion corresponding to the road in the first original image to thereby generate the fourth original image for learning and (ii) has combined the third segmentation GT image with the first segmentation GT image in such a way that the third segmentation GT image is located at a par- ticular location in the first segmentation GT image corresponding to the arbitrary location in the first original image to thereby generate the fourth segmentation GT image for learning.

As one example, at the process of (IV), the computing device has performed processes of generating the fourth original image for learning and the fourth segmentation GT image for learning for a multiple times to thereby generate the plurality of different fourth original images for learning and the plurality of different fourth segmentation GT images for learning.

In accordance with still another aspect of the present invention, there is provided a computing device for generating at least one data set for learning to be used for detecting at least one obstruction in autonomous driving circumstances, including: a communication part for obtaining (i-1) at least one first original image indicating at least one driving situation on at least one road and (i-2) at least one first segmentation ground truth (GT) image corresponding to the first original image, and obtaining (ii-1) at least one second original image including at least one image of at least one specific object and (ii-2) at least one second segmentation GT image which includes segmentation information for the specific object and corresponds to the second original image; and a processor for obtaining (I) (i) at least one third original image generated by cutting a portion corresponding to the specific object from the second original image and (ii) at least one third segmentation GT image generated by cutting pixels corresponding to an area where the specific object is located from the second segmentation GT image, and (II) creating the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located.

As one example, at the process of (II), (II_1) the processor modifies the third original image and the third segmentation GT image by a same scheme, to thereby create modified third original images and modified third segmentation GT images, respectively; and (II_2) the processor combines the modified third original images and the modified third segmentation GT images with the first original image and the third segmentation GT image, respectively.

As one example, at the process of (II_1), the processor modifies the third original image and the third segmentation GT image using at least one of affine transformation algorithm and thin-plate spline interpolation algorithm.

As one example, the processor repeatedly performs the process of (II_1) and the process of (II_2) while changing at least part of the algorithms applied at the process of (II_1) and specific parameters thereof to thereby generate the plurality of different fourth original images for learning and the plurality of different fourth segmentation GT images for learning.

As one example, the first original image and the first segmentation GT image are selected from a database of various road-driving images and a database of segmentation GT images corresponding thereto, respectively, and wherein the second original image and the second segmentation GT image are selected from a database of various original images of various objects by types of objects and a database of semantic segmentation GT images corresponding thereto, respectively.

As one example, at the process of (I), the processor cuts the specific object from the second original image and the second segmentation GT image using semantic segmentation information of the second segmentation GT image.

As one example, at the process of (I), the processor (i) cuts an area having semantic segmentation information for the specific object in the second segmentation GT image to thereby obtain the third segmentation GT image and (ii) refers to location of the pixels within the second original image corresponding to pixel information of the third segmentation GT image in the second segmentation GT image to thereby obtain the third original image.

As one example, at the process of (II), the processor (i) determines a portion corresponding to a road in the first original image, then combines the third original image with the first original image in such a way that the third original image is located at an arbitrary location in the portion corresponding to the road in the first original image to thereby generate the fourth original image for learning and (ii) combines the third segmentation GT image with the first segmentation GT image in such a way that the third segmentation GT image is located at a particular location in the first segmentation GT image corresponding to the arbitrary location in the first original image to thereby generate the fourth segmentation GT image for learning.

As one example, at the process of (II), the processor performs processes of generating the fourth original image for learning and the fourth segmentation GT image for learning for a multiple times to thereby generate the plurality of different fourth original images for learning and the plurality of different fourth segmentation GT images for learning.

As one example, the first segmentation GT image includes segmentation information on the road.

In accordance with still yet another aspect of the present invention, there is provided a learning device for learning through a convolutional neural network (CNN), including: (a) a communication part, on condition that (I) a computing device has obtained (i) at least one first original image indicating at least one driving situation on at least one road and (ii) at least one first segmentation ground truth (GT) image corresponding to the first original image; (II) the computing device has obtained (i) at least one second original image including at least one image of at least one arbitrary specific object and (ii) at least one second segmentation GT image which includes segmentation information for the specific object and corresponds to the second original image; (III) the computing device has obtained (i) at least one third original image generated by cutting a portion corresponding to the specific object from the second original image and (ii) at least one third segmentation GT image generated by cutting pixels corresponding to an area where the specific object is located from the second segmentation GT image; and (IV) the computing device has created the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located, for receiving the fourth original image for learning as at least one image for learning to be used for detecting at least one obstruction in autonomous driving circumstances; and (b) a processor for applying a plurality of operations of the CNN to the fourth original image for learning to thereby obtain an output image and comparing the output image with the fourth segmentation GT image for learning, and then adjusting a parameter thereof through backpropagation.

As one example, at the process of (IV), (IV_1) the computing device has modified the third original image and the third segmentation GT image by a same scheme, to thereby create modified third original images and modified third segmentation GT images, respectively; and (IV_2) the computing device has combined the modified third original images and the modified third segmentation GT images with the first original image and the third segmentation GT image, respectively.

As one example, the computing device has repeatedly performed the process of (IV_1) and the process of (IV_2) while changing at least part of the algorithms applied at the process of (IV_1) and specific parameters thereof to thereby generate the plurality of different fourth original images for learning and the plurality of different fourth segmentation GT images for learning.

As one example, at the process of (IV), the computing device (i) has determined a portion corresponding to a road in the first original image, then has combined the third original image with the first original image in such a way that the third original image is located at an arbitrary location in the portion corresponding to the road in the first original image to thereby generate the fourth original image for learning and (ii) has combined the third segmentation GT image with the first segmentation GT image in such a way that the third segmentation GT image is located at a particular location in the first segmentation GT image corresponding to the arbitrary location in the first original image to thereby generate the fourth segmentation GT image for learning.

As one example, at the process of (IV), the computing device has performed processes of generating the fourth original image for learning and the fourth segmentation GT image for learning for a multiple times to thereby generate the plurality of different fourth original images for learning and the plurality of different fourth segmentation GT images for learning.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
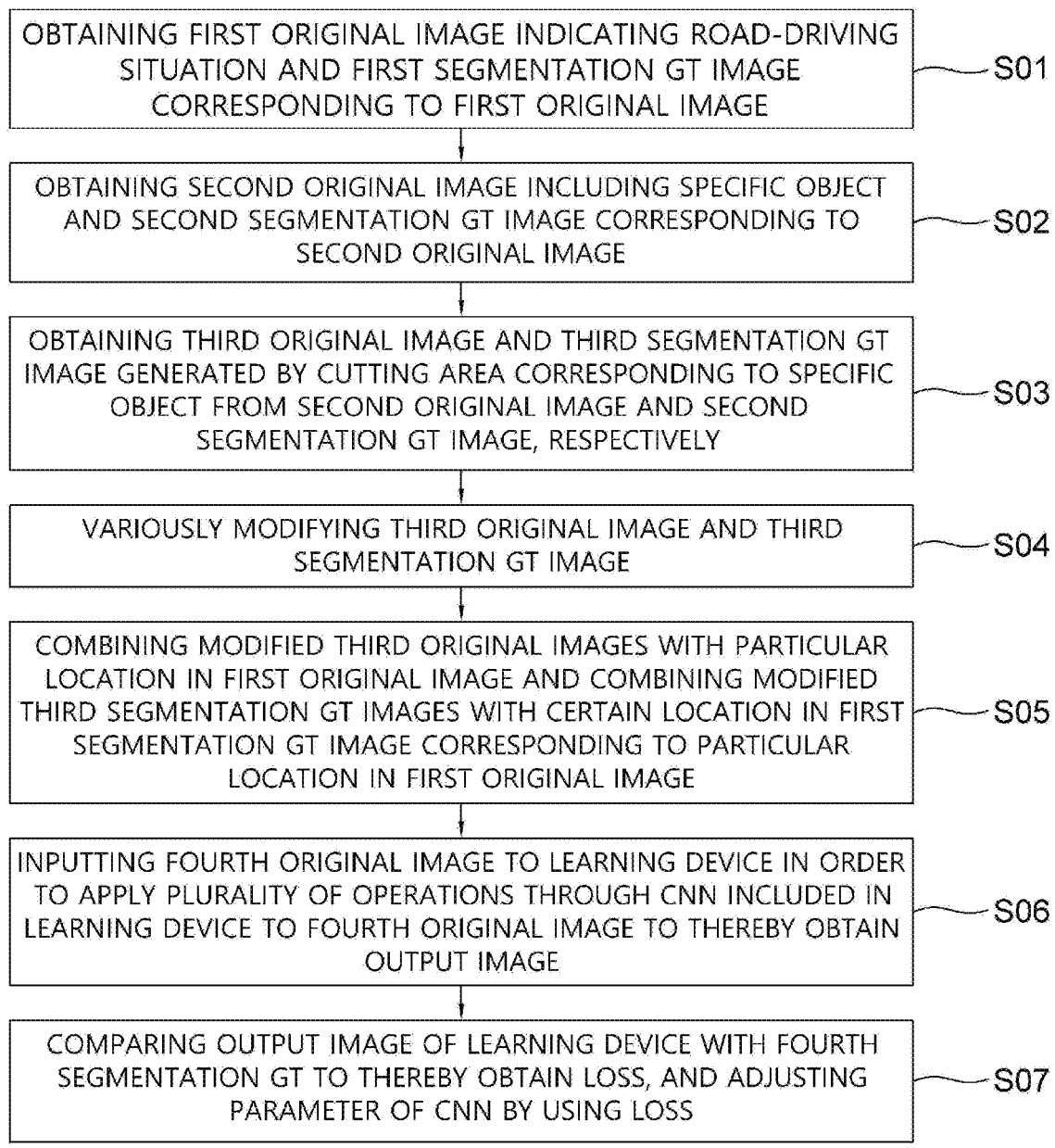
FIG. 1 is a flowchart illustrating a method for generating at least one data set for learning to be used for detection of at least one obstruction in autonomous driving circumstances and performing a learning process using the generated data set for learning in accordance with the present invention.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

Figure 2:
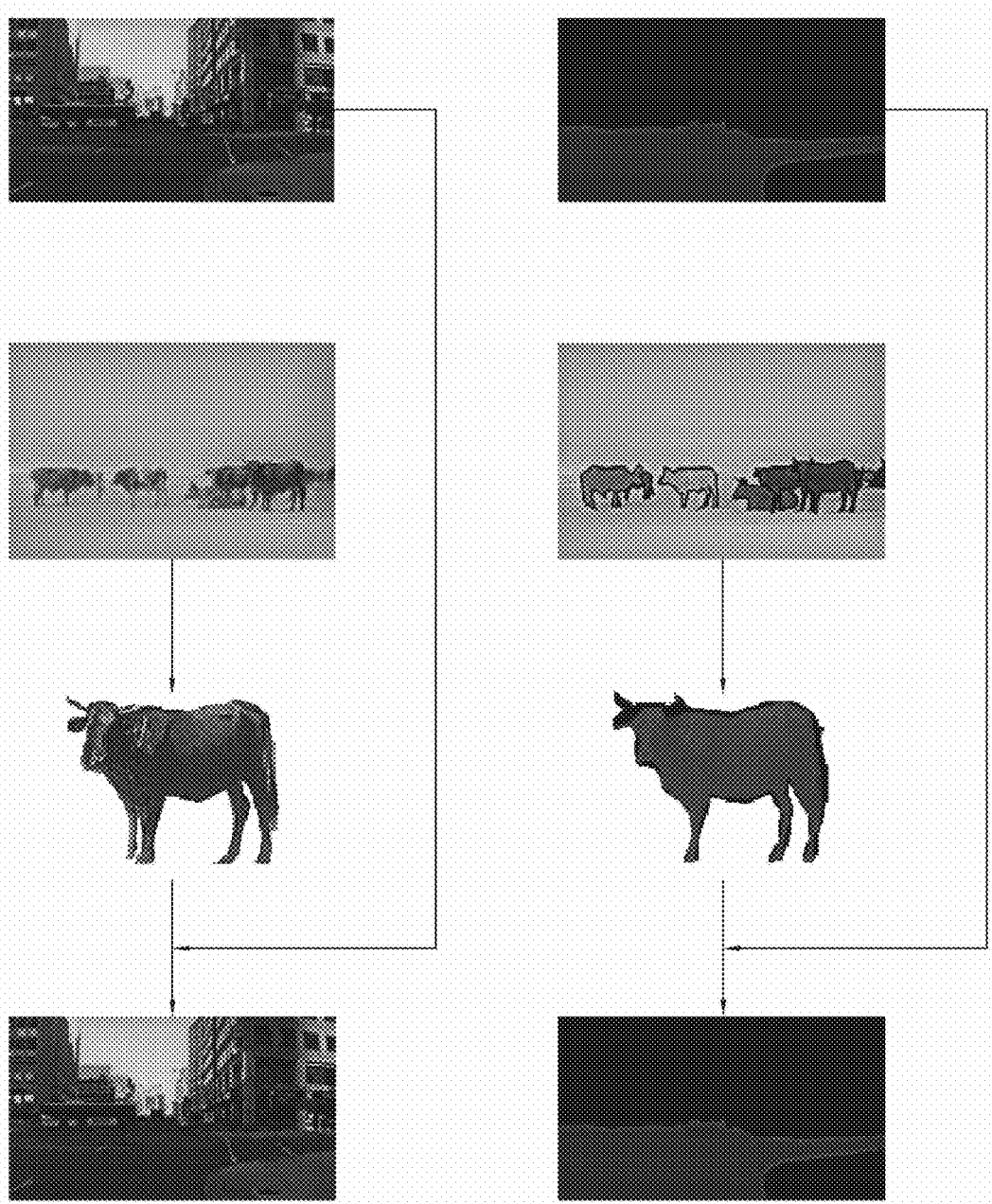
FIG. 2 is a diagram illustrating a process of generating the data set for learning in accordance with the present invention.

FIG. 1 is a flowchart illustrating a method for generating at least one data set for learning to be used for detection of at least one obstruction in autonomous driving circumstances and applying a learning process to convolutional neural network (CNN) by using the generated data set for learning in accordance with the present invention, and FIG. 2 is a diagram illustrating a process of generating the data set for learning in accordance with the present invention.

Referring to FIGS. 1 and 2, a method of generating the data set for learning to be used for detection of the obstruction in the autonomous driving circumstances in accordance with the present invention includes a step of obtaining a first original image indicating a road-driving situation and a first segmentation ground truth (GT) image corresponding to the first original image at a step of S01, a step of obtaining a second original image including a specific object and a second segmentation GT image corresponding to the second original image at a step of S02, a step of obtaining a third original image and a third segmentation GT image generated by cutting an area corresponding to the specific object from the second original image and that from the second segmentation GT image, respectively, at a step of S03, a step of variously modifying the third original image and the third segmentation GT image to thereby create modified third original images and modified third segmentation GT images, respectively, at a step of S04, a step of combining the modified third original images with the first original image at particular locations of the first original image and combining the modified third segmentation GT images with the first segmentation GT image at certain locations of the first segmentation GT image corresponding to the particular locations of the first original image to thereby generate the data set for learning including a fourth original image for learning and a fourth segmentation GT image for learning corresponding to the fourth original image at a step of S05, and a step of inputting the fourth original image to a learning device and applying a plurality of operations through the CNN included in the learning device to the fourth original image to thereby obtain an output image at a step of S06, and comparing the output image with the fourth segmentation GT in the data set for learning to thereby obtain a loss, and then adjusting at least one parameter of the CNN in the learning device through backpropagation process at a step of S07. Such a process may be performed in a computing device generating the data set for learning.

A communication part of the computing device obtains the first original image indicating a road-driving situation and the first segmentation GT image corresponding to the first original image and obtains the second original image including at least one specific object and the second segmentation GT image which includes segmentation information on the specific object and corresponds to the second original image. Further, a processor of the computing device performs (i) a process of obtaining the third original image generated by cutting the area of the specific object from the second original image and the third segmentation GT image generated by cutting pixels of an area where the specific object is located in the second segmentation GT image; and (ii) a process of generating the fourth original image for learning and the fourth segmentation GT image for learning corresponding to the fourth original image by combining the third original image with the first original image and combining the third segmentation GT image with the first segmentation GT image in such a way that the third segmentation GT image is positioned at at least one specific location on the first segmentation GT image. Herein, the specific location corresponds to at least one certain location in the first original image where the third original image is located.

Hereinafter, a method for generating the data set for learning to be used for detection of the obstruction in autonomous driving circumstances in accordance with the present invention will be described in more detail by referring to FIGS. 1 and 2. First, at the step of S01, the first original image is selected from a general road-driving image DB as shown in the top-left side of FIG. 2, and the first segmentation GT image is selected from a first segmentation GT image DB corresponding to the general road-driving image DB.

Herein, the road-driving image DB and the segmentation GT image DB corresponding thereto include various road-driving-related images and various segmentation GT images corresponding thereto, respectively, and the road-driving image DB and the segmentation GT image DB may be formed as one DB. Further, the first segmentation GT image may be an image containing semantic segmentation information for various objects in the first original image, but it may be sufficient to contain at least segmentation information on a road as the first segmentation GT image.

Thereafter, at the step of S02, the second original image containing an image of a specific object is selected from an original image DB of various objects classified by kinds as shown in the left side of the second row of FIG. 2. Herein, the second original image does not have to be related to a road-driving circumstance unlike the first original image and may generally be a circumstance other than the road-driving circumstance. Further, the second segmentation GT image containing segmentation information on the specific object in the second original image and corresponding to the second original image is selected from a second segmentation GT image DB corresponding to the original image DB of various objects classified by kinds as shown in the right side of the second row of FIG. 2. The second segmentation GT image DB may include semantic segmentation images.

Herein, the original image DB of various objects classified by kinds and the semantic segmentation DB may be formed as one DB and may include images of various arbitrary objects which may be encountered on a road, such as a cow, a tiger, a bear, a giraffe, a crocodile, a dog, a cat, a person and a bird, and its corresponding GT images generated by applying processes of semantic segmentation to the images of various arbitrary objects.

Thereafter, at the step of S03, the third original image is generated by cutting portions of the specific objects, e.g., regions of cows in the left side, in the second original image as shown in the left side of the third row of FIG. 2, and the third segmentation GT image is generated by cutting pixels corresponding to the portions of the specific objects in the second segmentation GT image as shown on the right side of the third row of FIG. 2.

Herein, the computing device may first cut the third segmentation GT image from the second segmentation GT image and then cut the portions corresponding to the specific objects from the second original image based on pixel information of the cut third segmentation GT image to thereby generate the third original image. In detail, the computing device uses a method of cutting the portions corresponding to the specific objects from the second original image and those from the second segmentation GT image by using the semantic segmentation information of the second segmentation GT image. Specifically, the third segmentation GT image is obtained by cutting the areas having semantic segmentation information for the specific objects in the second segmentation GT image, and the third original image is obtained by referring to location of the pixels within the second original image corresponding to pixel information of the third segmentation GT image in the second segmentation GT image.

Referring to FIG. 1 again, at the steps of S04 and S05, the computing device combines the cut third original image with the first original image and combines the third segmentation GT image with the first segmentation GT image in such a way that the combined location of the third segmentation GT image in the first segmentation GT image may correspond to the combined location of the third original image in the first original. In this way, the fourth original image for learning and the fourth segmentation GT image for learning corresponding thereto are generated. The generated fourth original image for learning and the fourth segmentation GT image for learning become the data set for learning.

In accordance with one example embodiment of the present invention, the computing device may modify the third original image and the third segmentation GT image by using the same scheme and then combine the modified third original image and the modified third segmentation GT image with the first original image and the first segmentation GT image, respectively. Affine transform algorithm, thin-plate spline interpolation algorithm, etc. may be used for such a scheme of modification. Further, the third original image and the third segmentation GT image may be modified by changing the size thereof, rotating the images by a preset angle, reversing the images such that right and left sides of the images become reversed, etc. Such a step(s) may be performed by repeating the above-described combination process(es), resulting in the generation of variously modified third original images and variously modified third segmentation GT images by changing algorithms or specific parameters applied thereto or changing the size or the rotation angle. In this way, the plurality of different fourth original images for learning and the plurality of different fourth segmentation GT images for learning may be generated. Namely, the various fourth original images for learning and the various fourth segmentation GT images for learning may be generated from one first original image and one first segmentation GT image and one third original image and one third segmentation GT image.

Meanwhile, since the first segmentation GT image includes segmentation information on the road as described above, the computing device determines a portion corresponding to the road in the first original image then combines the third original image with an area corresponding to the road in the first original image to thereby generate the fourth original image for learning. Herein, the third original image may be combined with the first original image at an arbitrary location selected among the area corresponding to the road in the first original image to thereby generate the fourth original image for learning. Then, the third segmentation GT image is combined with the first segmentation GT image in such a way that the combined location of the third segmentation GT image in the first segmentation GT image corresponds to the combined location of the third original image in the first original image to thereby generate the fourth original image for learning. Further, at this step, the computing device may perform the process of generating the fourth original images for learning and the fourth segmentation images for learning while continually arbitrarily changing the combined location selected among the area corresponding to the road. In this way, the plurality of different fourth original images for learning and the plurality of different fourth segmentation GT images for learning are generated. As in the case of repeating the modification algorithm, the various fourth original images for learning and the various fourth segmentation GT images for learning may be generated from one first original image and one first segmentation GT image and one third original image and one third segmentation GT image.

Thereafter, referring to FIG. 1 again, the steps of S06 and S07 are performed by using the combined fourth original image as an input image.

Figure 3:
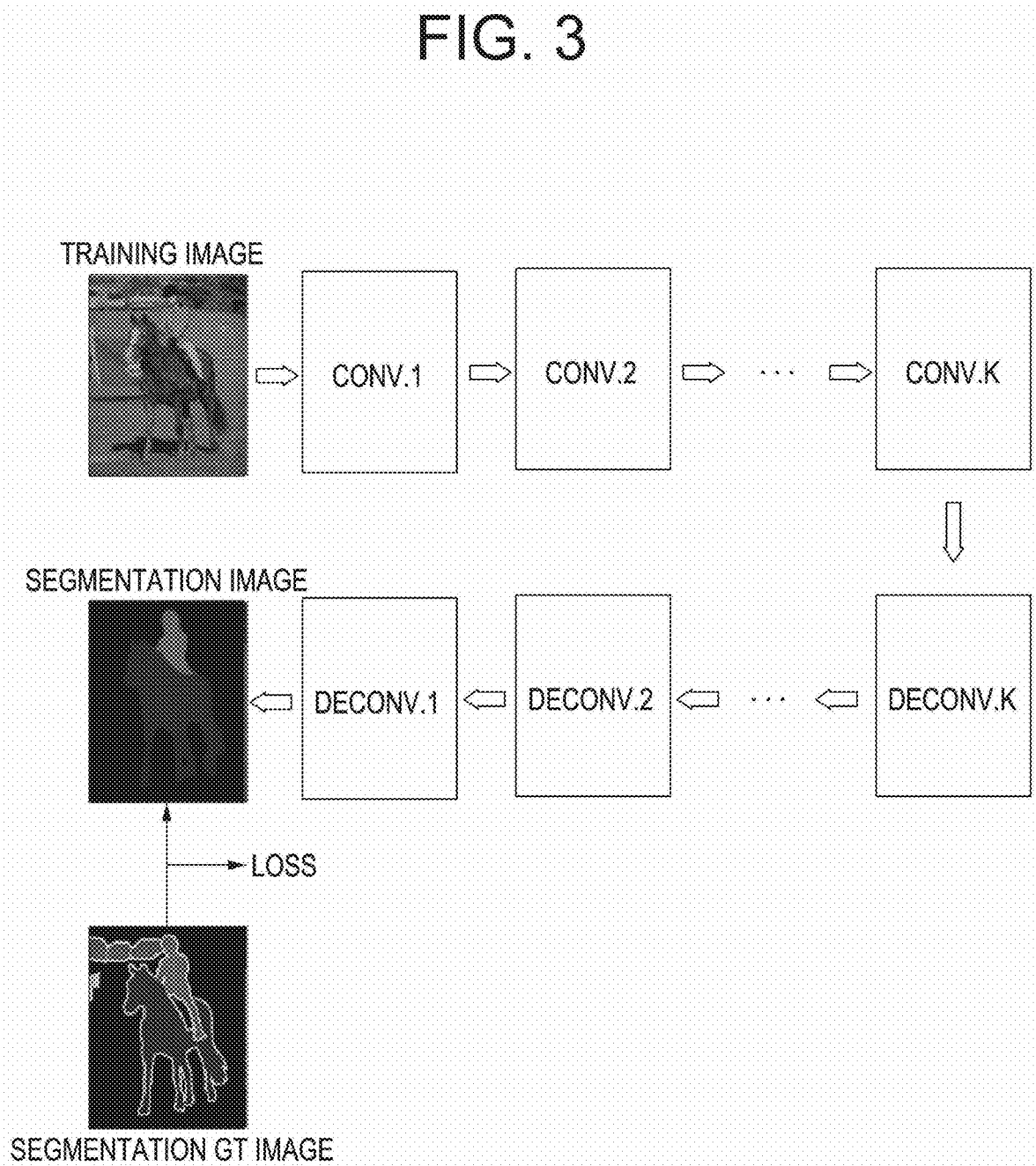
FIG. 3 is a diagram illustrating a process of performing convolutional neural network (CNN) using the data set for learning in accordance with the present invention.

FIG. 3 is a diagram illustrating a process of performing CNN image segmentation using the data set for learning in accordance with the present invention.

The step S06 and the step S07 will be specifically described below by referring to FIG. 3. A pair of the fourth original image and the fourth segmentation GT image is selected from the generated data sets for learning and the selected fourth original image is then inputted to the CNN device as a training image. If the training image is inputted, one or more convolution operations are performed through a plurality of filters (or convolution layer) to thereby obtain feature maps. Thereafter, one or more deconvolution operations are applied to an output of Conv.K through a plurality of filters (or deconvolution layer) to thereby obtain a segmentation image. In this way, image encoding is performed by the convolution operations to thereby obtain the feature maps, and the output of Conv.K is decoded to thereby obtain the segmentation image (or a label image). Herein, the above-described structure of the CNN device is called an encoding-decoding network or U-Net. In the encoding process, the size of the input image is reduced to, for example, ½ whenever each convolution operation is performed in order to reduce the amount of operations by reducing the image size. Furthermore, in the encoding process, the number of channels of the image inputted through the convolution filter increases in order to obtain a complicated pattern through the increased channel while utilizing the advantage of the reduced amount of the operations. In this example, in the encoding process, whenever convolution filtering is performed, the image size is reduced to, e.g., ½ and the number of channels is doubled. The high frequency area is removed from such a reduced feature map to a large extent and the feature map comes to have information centered on the low frequency area. Herein, such a low frequency area means a meaningful part of an image, that is, a specific part such as a sky, a road, a building and a car. Such meaning parts may be inferred as the segmentation image through the deconvolution operations, that is, decoding operations.

Meanwhile, the CNN device calculates a loss which is a difference between (i) the segmentation image generated by using the fourth original image as a training image and (ii) the fourth segmentation GT image, during the learning process. Further, the parameter of the CNN device may be optimized by backpropagating the loss.

In accordance with the present invention, a large amount of image sets about situations where various objects exist on roads, which cannot be easily obtained in image data obtained in real autonomous driving circumstances on roads, may be provided. As such, objects which are not frequently found in the actual driving circumstances on the roads may be successfully detected at any autonomous driving circumstances through the CNN learning.

It may be understood to one of ordinary skill in the art that (i) transmission/reception of the image data such as a training image and a test image may be performed by the communication part of the learning device and the test device, (ii) a feature map and the like may be held/maintained by the processor (and/or memory) of the learning device and the test device, and (iii) processes of the convolution operations, the deconvolution operations, and the loss-calculating operations may be mainly performed by the processor of the learning device and the test device, but the present invention is not limited to these examples.

The present invention has an effect of securing the data set for learning to be used for improving the performance of detecting objects which are not frequently found in the actual driving circumstances.

The present invention has another effect of providing the learning method for detecting objects which are not frequently found in the actual driving circumstances with a high accuracy through a process of learning the parameters of the convolution neural network (CNN) by using the above-mentioned data sets as the training images for the CNN.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for generating at least one data set for learning to be used for detecting at least one obstruction in autonomous driving circumstances, comprising steps of:
   (a) a computing device selecting (i) at least one first original image indicating at least one driving situation on at least one road and (ii) at least one first segmentation ground truth (GT) image corresponding to the first original image;
   (b) the computing device obtaining (i) at least one second original image including at least one image of a specific object, the specific object being not related to a road driving circumstance and not frequently found in an actual driving circumstance and (ii) at least one second segmentation GT image which includes segmentation information for the specific object, and in response to selecting the second original image, acquiring at least one second segmentation GT image which includes segmentation information for the specific object and corresponds to the second original image;
   (c) the computing device obtaining (i) at least one third original image generated by cutting a portion corresponding to the specific object from the second original image and (ii) at least one third segmentation GT image generated by cutting pixels corresponding to an area where the specific object is located from the second segmentation GT image; and
   (d) the computing device creating the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located,
   wherein the step of (d) further includes steps of:
   (d_1) the computing device modifying the third original image and the third segmentation GT image by a same scheme, to thereby create modified third original images and modified third segmentation GT images, respectively; and
   (d_2) the computing device combining the modified third original images and the modified third segmentation GT images with the first original image and the third segmentation GT image, respectively,
   wherein, at the step of (d), the computing device (i) determines a portion corresponding to a road in the first original image, then combines the third original image with the first original image in such a way that the third original image is located at an arbitrary location in the portion corresponding to the road in the first original image to thereby generate the fourth original image for learning and (ii) combines the third segmentation GT image with the first segmentation GT image in such a way that the third segmentation GT image is located at a particular location in the first segmentation GT image corresponding to the arbitrary location in the first original image to thereby generate the fourth segmentation GT image for learning, and
   wherein, at the step of (d), the computing device performs processes of generating the fourth original image for learning and the fourth segmentation GT image for learning for a multiple times to thereby generate the plurality of different fourth original images for learning and the plurality of different fourth segmentation GT images for learning, and
   wherein the first segmentation GT image includes one or more $(1\_1)$-st regions, corresponding to one or more initial objects included in the first original image, which are noted with one or more $(1\_1)$-st indications, and at least one $(1\_2)$-nd region corresponding to a first background included in the first original image, which is noted with a $(1\_2)$-nd indication,
   wherein the second segmentation GT image includes at least one $(2\_1)$-st region, corresponding to the specific object, which is noted with at least one $(2\_1)$-st indication, at least one $(2\_2)$-nd region, corresponding to a second background included in the second original image, which is noted with a $(2\_2)$-nd indication, and one or more $(2\_3)$-rd regions, corresponding to other regions than the specific object and the second background in the second original image, which are noted with one or more $(2\_3)$-rd indications,
   wherein the third segmentation GT image includes at least one $(3\_1)$-st region corresponding to the specific object, which is noted with at least one $(3\_1)$-st indication, and
   wherein the fourth segmentation GT image includes one or more $(4\_1)$-st regions, corresponding to the initial objects originally included in the first original image, which are noted with one or more $(4\_1)$-st indications, at least one $(4\_2)$-nd region, corresponding to the specific object included in the second original image, which is noted with at least one $(4\_2)$-nd indication, and at least one $(4\_3)$-rd region, corresponding to a third background included in the fourth original image, which is noted with a $(4\_3)$-th indication.

2. The method of claim 1, wherein, at the step of (d_1), the computing device modifies the third original image and the third segmentation GT image using at least one of affine transformation algorithm and thin-plate spline interpolation algorithm.

3. The method of claim 1, wherein the computing device repeatedly performs the step of (d_1) and the step of (d_2) while changing at least part of the algorithms applied at the step of (d_1) and specific parameters thereof to thereby generate the plurality of different fourth original images for learning and the plurality of different fourth segmentation GT images for learning.

4. The method of claim 1, wherein the first original image and the first segmentation GT image are selected from a database of various road-driving images and a database of segmentation GT images corresponding thereto, respectively, and wherein the second original image and the second segmentation GT image are selected from a database of various original images of various objects by types of objects and a database of semantic segmentation GT images corresponding thereto, respectively.

5. The method of claim 4, wherein, at the step of (c), the computing device cuts the specific object from the second original image and the second segmentation GT image using semantic segmentation information of the second segmentation GT image.

6. The method of claim 5, wherein, at the step of (c), the computing device (i) cuts an area having semantic segmentation information for the specific object in the second segmentation GT image to thereby obtain the third segmentation GT image and (ii) refers to location of the pixels within the second original image corresponding to pixel information of the third segmentation GT image in the second segmentation GT image to thereby obtain the third original image.

7. The method of claim 1, wherein the first segmentation GT image includes segmentation information on the road.

8. A method for learning through a convolutional neural network (CNN), comprising steps of:

(a) a learning device, on condition that (I) a computing device has obtained (i) at least one first original image indicating at least one driving situation on at least one road and (ii) at least one first segmentation ground truth (GT) image corresponding to the first original image; (II) the computing device has selected (i) at least one second original image including at least one image of a specific object the specific object, being not related to a road driving circumstance and not frequently found in an actual driving circumstance, and (ii) in response to selecting the second original image, acquiring at least one second segmentation GT image which includes segmentation information for the specific object and corresponds to the second original image; (III) the computing device has obtained (i) at least one third original image generated by cutting a portion corresponding to the specific object from the second original image and (ii) at least one third segmentation GT image generated by cutting pixels corresponding to an area where the specific object is located from the second segmentation GT image; and (IV) the computing device has created the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located, receiving the fourth original image for learning as at least one image for learning to be used for detecting at least one obstruction in autonomous driving circumstances; and (b) the learning device applying a plurality of operations of the CNN to the fourth original image for learning to thereby obtain an output image and comparing the output image with the fourth segmentation GT image for learning, and then adjusting a parameter thereof through backpropagation, wherein, at the process of (IV), (IV_1) the computing device has modified the third original image and the third segmentation GT image by a same scheme, to thereby create modified third original images and modified third segmentation GT images, respectively; and (IV_2) the computing device has combined the modified third original images and the modified third segmentation GT images with the first original image and the third segmentation GT image, respectively, and at the process (IV), the computing device has modified the modified third original images and the modified third segmentation GT images with the first original image and the third segmentation GT image, respectively.

9. The method of claim 8, wherein the computing device has repeatedly performed the process of (IV_1) and the process of (IV_2) while changing at least part of the algorithms applied at the process of (IV_1) and specific parameters thereof to thereby generate the plurality of different fourth original images for learning and the plurality of different fourth segmentation GT images for learning.

10. The method of claim 8, wherein, at the process of (IV), the computing device (i) has determined a portion corresponding to a road in the first original image, then has combined the third original image with the first original image in such a way that the third original image is located at an arbitrary location in the portion corresponding to the road in the first original image to thereby generate the fourth original image for learning and (ii) has combined the third segmentation GT image with the first segmentation GT image in such a way that the third segmentation GT image is located at a particular location in the first segmentation GT image corresponding to the arbitrary location in the first original image to thereby generate the fourth segmentation GT image for learning.

11. The method of claim 10, wherein, at the process of (IV), the computing device has performed processes of generating the fourth original image for learning and the fourth segmentation GT image for learning for a multiple times to thereby generate the plurality of different fourth original images for learning and the plurality of different fourth segmentation GT images for learning.

12. A computing device for generating at least one data set for learning to be used for detecting at least one obstruction in autonomous driving circumstances, comprising:

a processor including circuitry configured to obtain (i-1) at least one first original image indicating at least one driving situation on at least one road and (i-2) at least one first segmentation ground truth (GT) image corresponding to the first original image, and obtaining (ii-1) at least one second original image including at least one image of a specific object, the specific object being not related to a road driving circumstance and not frequently found in an actual driving circumstance, and (ii-2) in response to selecting the second original image, acquiring at least one second segmentation GT image which includes segmentation information for the specific object and corresponds to the second original image; and obtain (I) (i) at least one third original image generated by cutting a portion corresponding to the specific object from the second original image and (ii) at least one third segmentation GT image generated by cutting pixels corresponding to an area where the specific object is located from the second segmentation GT image, and (II) creating the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located, wherein, at the process of (II), the processor (i) determines a portion corresponding to a road in the first original image, then combines the third original image with the first original image in such a way that the third original image is located at an arbitrary location in the portion corresponding to the road in the first original image to thereby generate the fourth original image for learning and (ii) combines the third segmentation GT image with the first segmentation GT image in such a way that the third segmentation GT image is located at a particular location in the first segmentation GT image corresponding to the arbitrary location in the first original image to thereby generate the fourth segmentation GT image for learning, and at the process of (II), the processor performs processes of generating the fourth original image for learning and the fourth segmentation GT image for learning for a multiple times to thereby generate the plurality of different fourth original images for learning and the plurality of different fourth segmentation GT images for learning.

13. The computing device of claim 12, wherein, at the process of (II), (II_1) the processor modifies the third original image and the third segmentation GT image by a same scheme, to thereby create modified third original images and modified third segmentation GT images, respectively; and (II_2) the processor combines the modified third original images and the modified third segmentation GT images with the first original image and the third segmentation GT image, respectively.

14. The computing device of claim 13, wherein, at the process of (II_1), the processor modifies the third original image and the third segmentation GT image using at least one of affine transformation algorithm and thin-plate spline interpolation algorithm.

15. The method of claim 13, wherein the processor repeatedly performs the process of (II_1) and the process of (II_2) while changing at least part of the algorithms applied at the process of (II_1) and specific parameters thereof to thereby generate the plurality of different fourth original images for learning and the plurality of different fourth segmentation GT images for learning.

16. The computing device of claim 12, wherein the first original image and the first segmentation GT image are selected from a database of various road-driving images and a database of segmentation GT images corresponding thereto, respectively, and wherein the second original image and the second segmentation GT image are selected from a database of various original images of various objects by types of objects and a database of semantic segmentation GT images corresponding thereto, respectively.

17. The computing device of claim 16, wherein, at the process of (I), the processor cuts the specific object from the second original image and the second segmentation GT image using semantic segmentation information of the second segmentation GT image.

18. The computing device of claim 17, wherein, at the process of (I), the processor (i) cuts an area having semantic segmentation information for the specific object in the second segmentation GT image to thereby obtain the third segmentation GT image and (ii) refers to location of the pixels within the second original image corresponding to pixel information of the third segmentation GT image in the second segmentation GT image to thereby obtain the third original image.

19. The computing device of claim 12, wherein the first segmentation GT image includes segmentation information on the road.

20. A learning device for learning through a convolutional neural network (CNN), comprising:

a processor configured to in response to (I) a computing device having obtained (i) at least one first original image indicating at least one driving situation on at least one road and (ii) at least one first segmentation ground truth (GT) image corresponding to the first original image; (II) the computing device having selected (i) at least one second original image including at least one image of a specific object, the specific object being not related to a road driving circumstance and not frequently found in an actual driving circumstance, and (ii) in response to selecting the second original image, acquiring at least one second segmentation GT image which includes segmentation information for the specific object and corresponds to the second original image; (III) the computing device having obtained (i) at least one third original image generated by cutting a portion corresponding to the specific object from the second original image and (ii) at least one third segmentation GT image generated by cutting pixels corresponding to an area where the specific object is located from the second segmentation GT image; and (IV) the computing device having created the data set for learning which includes at least one fourth original image for learning and at least one fourth segmentation GT image for learning corresponding to the fourth original image for learning by performing processes of (i) combining the first original image with the third original image to thereby create the fourth original image for learning and (ii) combining the first segmentation GT image with the third segmentation GT image in such a way that the third segmentation GT image is positioned at at least one specific location on the first segmentation GT image to thereby create the fourth segmentation GT image for learning, wherein the specific location corresponds to at least one certain location in the first original image where the third original image is located, for receiving the fourth original image for learning as at least one image for learning to be used for detecting at least one obstruction in autonomous driving circumstances; and configured to apply a plurality of operations of the CNN to the fourth original image for learning to thereby obtain an output image and comparing the output image with the fourth segmentation GT image for learning, and then adjust a parameter thereof through backpropagation, wherein, at the process of (IV) performed by the computing device, (IV_1) the computing device has modified the third original image and the third segmentation GT image by a same scheme, to thereby create modified third original images and modified third segmentation GT images, respectively; and (IV_2) the computing device has combined the modified third original images and the modified third segmentation GT images with the first original image and the third segmentation GT image, respectively, and at the process (IV), the computing device has modified the modified third original images and the modified third segmentation GT images with the first original image and the third segmentation GT image, respectively.

21. The learning device of claim 20, wherein the computing device has repeatedly performed the process of (IV_1) and the process of (IV_2) while changing at least part of the algorithms applied at the process of (IV_1) and specific parameters thereof to thereby generate the plurality of different fourth original images for learning and the plurality of different fourth segmentation GT images for learning.

22. The learning device of claim 20, wherein, at the process of (IV) performed by the computing device, the computing device (i) has determined a portion corresponding to a road in the first original image, then has combined the third original image with the first original image in such a way that the third original image is located at an arbitrary location in the portion corresponding to the road in the first original image to thereby generate the fourth original image for learning and (ii) has combined the third segmentation GT image with the first segmentation GT image in such a way that the third segmentation GT image is located at a particular location in the first segmentation GT image corresponding to the arbitrary location in the first original image to thereby generate the fourth segmentation GT image for learning.

23. The learning device of claim 22, wherein, at the process of (IV) performed by the computing device, the computing device has performed processes of generating the fourth original image for learning and the fourth segmentation GT image for learning for a multiple times to thereby generate the plurality of different fourth original images for learning and the plurality of different fourth segmentation GT images for learning.

* * * * *